Dec. 10, 1957
C. M. HUNTINGTON
2,815,648
HYDRAULIC TORQUE CONVERTER
Filed June 16, 1954
2 Sheets-Sheet 1
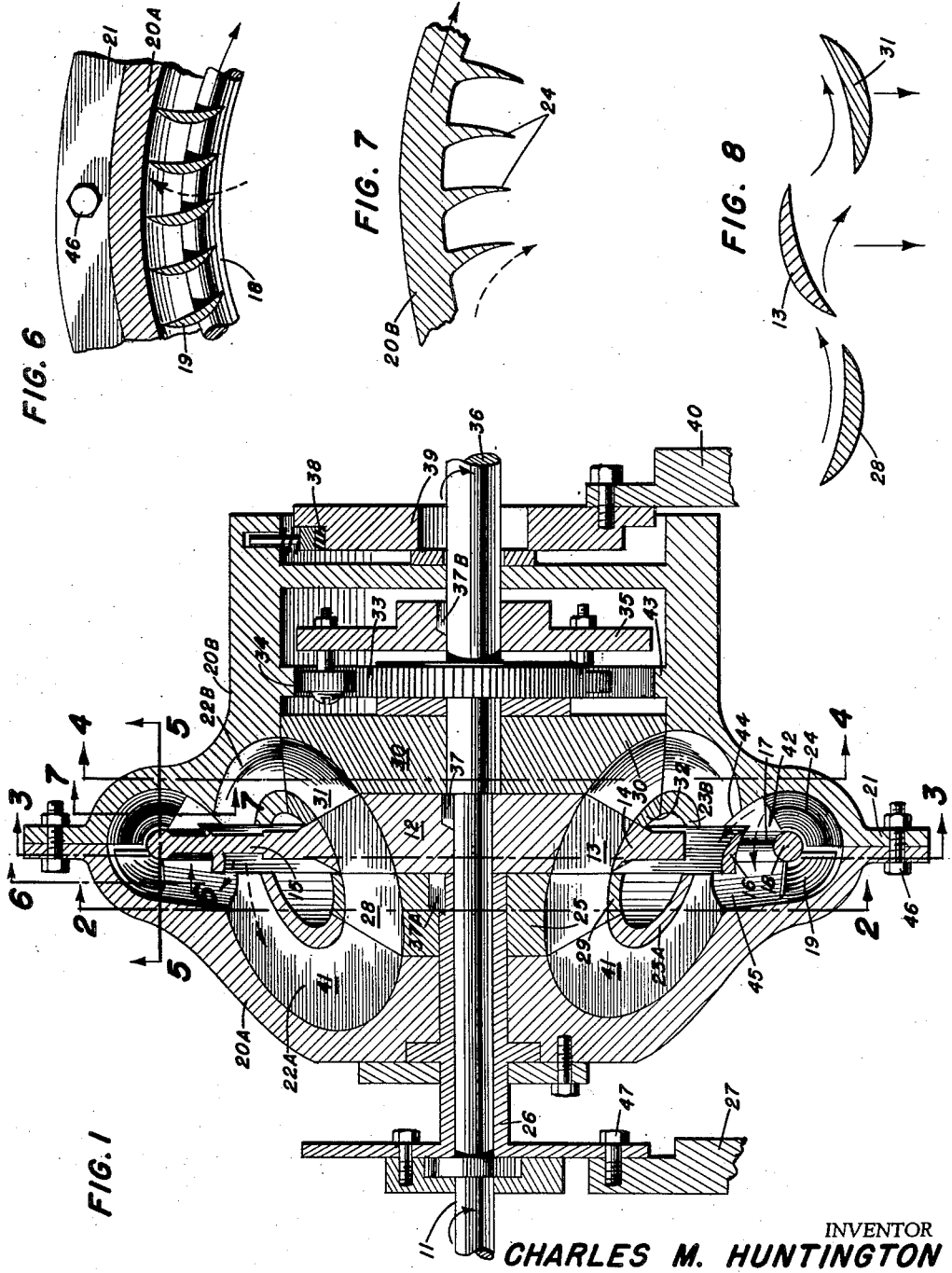
INVENTOR
CHARLES M. HUNTINGTON
BY
ATTORNEY

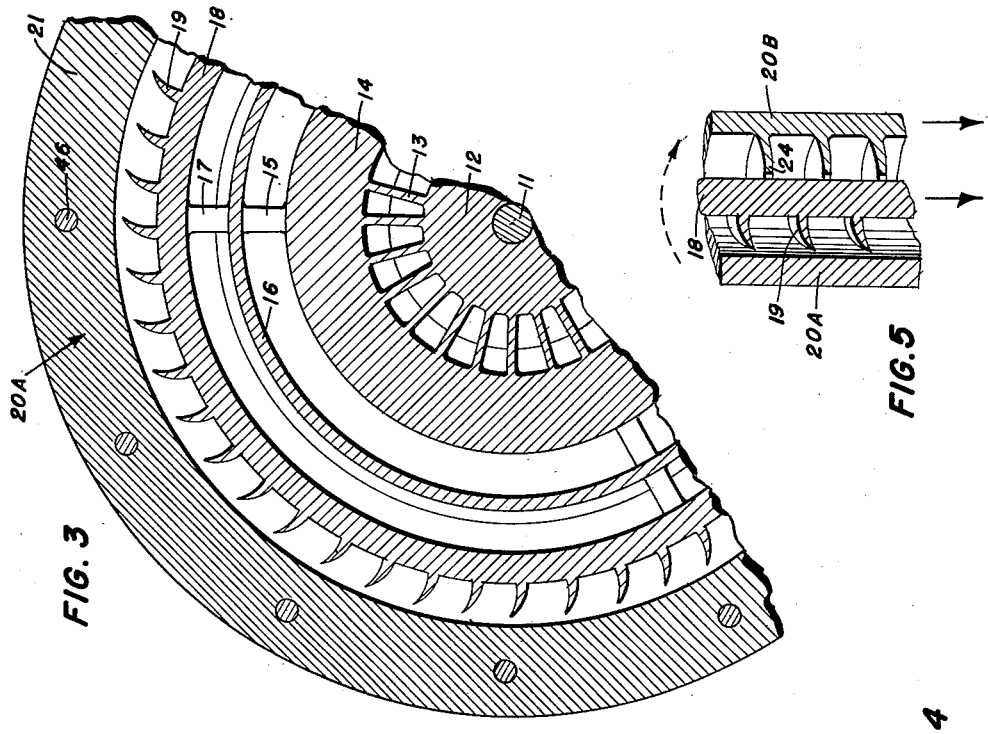
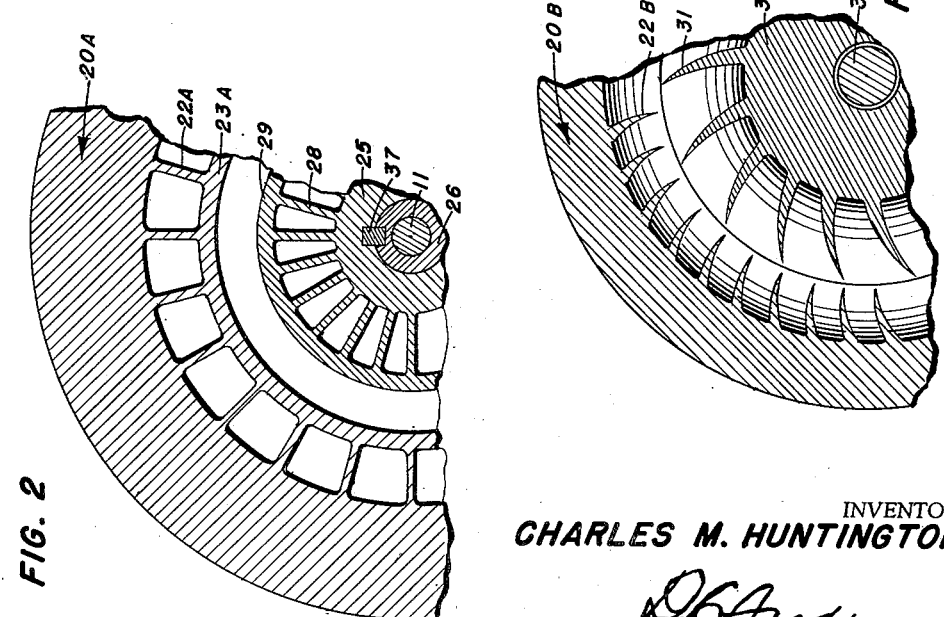

United States Patent Office 2,815,648
Patented Dec. 10, 1957

2,815,648

HYDRAULIC TORQUE CONVERTER

Charles M. Huntington, Albuquerque, N. Mex.

Application June 16, 1954, Serial No. 437,309

7 Claims. (Cl. 60—54)

(Granted under Title 35, U. S. Code (1952), sec. 266)

The invention described herein may be manufactured and used by or for the Government of the United States of America for governmental purposes without the payment of any royalties thereon or therefore.

This invention relates to a coacting mechanical and fluid power transmitting device, and more particularly to a variable speed transmission of the type wherein torque is multiplied and power is transmitted under varying load conditions through cooperation between a series of impeller and turbine blades enclosed in a casing containing two liquids of substantially different specific gravities. In conventional torque converters, only one fluid is utilized to transfer power from a driving shaft to a driven shaft. The use of only one fluid does not obtain the higher starting torque and greater efficiency under operating speeds and load conditions that is obtained by utilizing two fluids of different specific gravities.

One object of this invention is to provide a power transmitting mechanism in which the torque and slippage is varied substantially during operation for differing normal load conditions by varying the ratio of heavy liquid to light liquid without changing gears or making any mechanical changes in the mechanism.

A further object of this invention is to provide a torque converter having two sets of driving blades and two sets of driven blades, wherein one set of driving blades operates in conjunction with a corresponding set of driven blades as the primary torque drive while the other set of driving blades operates in conjunction with its corresponding set of driven blades as an auxiliary torque drive.

Another object of this invention is to provide a power transmitting device having more than one set of cooperating driving and driven blades and utilizing a mixture of two fluids, one of a heavy and one of a light specific gravity. The heavier fluid is utilized with the blades of the main turbine chamber to generate high torque for starting and heavy load conditions and through the blades of the auxiliary turbine chamber to reduce slippage and maintain more constant speed in the secondary turbine under normal loads and speeds. While the heavier fluid operates through the main chamber under starting and heavy load conditions the lighter fluid operates in the auxiliary chamber, and while the heavier fluid operates in the auxiliary chamber under normal loads and speeds the lighter fluid operates in the main chamber. At various speeds and loads various mixtures of the two fluids will operate between the sets of impeller and turbine blades to obtain a torque that is most favorable to those operating conditions.

A further object is to provide a power transmitting device utilizing two fluids, one of a heavier and one of a lighter specific gravity, with such being adaptable to fluid transmissions of both the fluid coupling and turbo torque converter type.

This invention is designed for use in motor vehicles of all types and in marine and industrial power installations where variations in working loads require a flexible coupling capable of converting the speed and torque supplied by the engine or motor to a different speed and torque in a driven shaft.

The liquid most commonly used in hydraulic mechanisms of this type is mineral oil with a specific gravity of approximately .82. By adding a second and much heavier liquid, for example mercury, which has a specific gravity of approximately 13.55, it is readily apparent that the force transmitted by the heavier liquid will be substantially greater per unit of volume than the force transmitted by the lighter liquid. Other liquids with specific gravities substantially different may be used and the use of oil and mercury as an example, shall in no way restrict the scope of this patent in regard to the use of other liquids with different specific gravities.

Other objects and novel features of the invention will be more apparent after a consideration of the following detailed description and when taken in connection with the accompanying drawings illustrating one form of the invention. It is to be expressly understood however that the drawings are utilized for purposes of illustration only and are not to be taken as a definition of the limits of the invention, and that modifications, variations, adaptions and equivalents may be resorted to within the scope, spirit and principles of the invention as claimed.

In the drawings:

Fig. 1 is a longitudinal section taken through the common axis of the rotary casing, cones and gear unit.

Fig. 2 is a partial transverse section in a plane indicated by the line 2—2 in Fig. 1.

Fig. 3 is a partial transverse section in a plane indicated by the line 3—3 in Fig. 1.

Fig. 4 is a partial transverse section in a plane indicated by the line 4—4 in Fig. 1.

Fig. 5 is a partial transverse section in a plane indicated by the line 5—5 in Fig. 1.

Fig. 6 is a partial transverse section in a plane indicated by the line 6—6 in Fig. 1.

Fig. 7 is a partial transverse section in a plane indicated by the line 7—7 in Fig. 1.

Fig. 8 is a schematic indication of the relationship between stator, impeller and the first turbine blades.

Referring to the drawings, the invention will be further described and explained by reference to the numbered parts.

Power is delivered to this torque converter by driving shaft 11 which extends axially into the central portion of the rotatably mountable casing formed by opposed shell members 20A and 20B. Adjacent to the end of shaft 11 there is attached by key 37, or through some other convenient manner, a rotary impeller unit shown in section by Fig. 3, comprising cone 12, blades 13, baffle disc 14, inner spokes 15, deflector band 16, outer spokes 17, auxiliary impeller ring 18, and auxiliary impeller blades 19. Since parts 12 through 19 inclusive rotate as a unit they are indicated as one piece but may be made separate parts and assembled as a single unit.

The outer casing of the unit is composed of two opposed sections 20A and 20B, said sections being securely bolted together at flange 21 by a plurality of bolts 46, with said casing being rotatably mounted on driving shaft 11 and driven shaft 36. The interior or main torus chamber 41 of the casing structures 20A and 20B contain a plurality of inwardly extending secondary turbine blades which are substantially part of the casing and which are designated 22A and 22B to correspond with the aforesaid sections of the casing. There is a slight space between adjacent ends of blades 22A and 22B to allow spokes 15 to rotate with the main impeller unit but otherwise blades 22A and 22B extend continuously through the outer portion of the main torus chamber 41 from the trailing edges of the primary turbine blades 31 to the leading edges of the stator blades 28. From primary turbine blades 31 to stator blades 28 the secondary blades 22A and 22B have a continuous and gradually increasing twist counter to the direction of rotation of the driving shaft 11. The twist in blades 22A and 22B causes the liquid following the path in the torus chamber 41 from the primary turbine blades 31 to the stator blades 28 to exert continuous force on the casing 22A and 22B, to cause it to rotate in the same direction as the driving shaft 11.

Stator cylinder 25 is located adjacent the narrow end of cone 12 and is mounted adjacent the end of stationary sleeve 26 and secured thereto by a key 37A. Sleeve 26 is fitted around drive shaft 11 and extends axially through casing 20A, being attached to a fixed support 27 by securing means 47 which prevents sleeve 26 from rotating. A plurality of stationary blades 28 extend outwardly from stator cylinder 25 and inwardly into main torus chamber 41 for guiding the flow of liquids to the impeller blades 13. Primary turbine rotor 30 is rotatably mounted adjacent the wider end of impeller cone 12 and is operably connected to the driven shaft 36 through spur gear 33, planetary gears 34 and planetary gear disc 35 which is secured to driven shaft 36 by key 37B. Said turbine rotor 30 having a plurality of primary turbine blades 31 which extend outwardly from rotor 30 and inwardly into the main torus chamber 41. The casing 20B is indicated as operably connected to driven shaft 36 through ring gear 43 and through planetary gears 34 and disc 35. The tips of turbine blades 22A, 22B and 31 and stator blades 28 are circumscribed respectively by rims 23A, 23B, 32 and 29 to restrict the liquids delivered by the impeller blades 13 from escaping excessively into the hollow space outside the turbine and stator blade tips. Baffle 14 mounted outwardly from the impeller blades 13 also restricts the liquids delivered by said impeller blades to prescribed channels through turbine blades 22A, 22B and 31 in the main torus chamber 41.

Enclosed in casing 20A and 20B and positioned concentrically and externally of the main torus chamber 41 is an auxiliary torus chamber 42. These two chambers are interconnected but deflector band 16 is positioned in the opening between the two chambers to regulate and guide the flow of the heavy liquid into the particular torus chamber where it will be most effective under differing torque and speed conditions. Auxiliary impeller blades 19 are attached to the periphery of the main impeller unit and are located in the portion of the auxiliary torus chamber 42 enclosed by casing 20A. Similarly shaped turbine blades 24 are located on the opposite side of the auxiliary torus chamber 42 enclosed by casing 20B with said blades 24 being attached to said casing 20B and extending inwardly into said auxiliary chamber 42. Blades 19 and 24 have a cupped or spherical curvature similar to pieces of metal cut from the periphery of a hollow sphere. Auxiliary impeller blades 19 are positioned to direct the flow of liquids from the inner portion of the auxiliary chamber 45 outwardly and axially towards the leading edges of the auxiliary turbine blades 24. The concave faces of the auxiliary impeller blades 19 are positioned in the direction of rotation of the impeller unit whereas the concave faces of the auxiliary turbine blades 24 are positioned opposite to the direction of rotation of the impeller blades 19. Turbine blades 24 are also positioned in the outer or auxiliary torus chamber 42 with their trailing edges at such an angle as to direct the flow of liquids from said blades 24 inwardly or towards the main torus chamber 41 with substantial force.

Although the operable connection to the driven shaft 36 shown herein is well known in the art and is not claimed as within the scope of this invention, it is intended that the primary turbine shall be of sufficient size and capacity and that the connection of this primary turbine unit to the driven shaft 36 shall be through a gear ratio sufficiently greater than that connecting the secondary turbine unit, so that the primary turbine unit will accelerate more rapidly than the secondary turbine unit whenever power from driven shaft 11 is increased.

For some applications of this invention it may be desirable to install means to prevent casing 20A and 20B from turning in a direction counter to that of the driving shaft 11 due to heavy torque resistance in driven shaft 36 and strong leverage applied through planetary gears 34. Brake shoe 38 and brake drum 39 illustrate one application of a non-reverse braking mechanism to prevent the casing 20A and 20B from turning counter clockwise to the rotation of driving shaft 11, but it is not intended that this invention shall include any specific application or design of a non-reverse mechanism.

Description of the operation of this preferred embodiment of the invention as indicated in Figures 1 to 8 inclusive is as follows:

In all drawings solid arrows indicate the direction of normal rotation, that is, the direction of rotation of drive shaft 11, with all moving parts rotating in the same direction around a common axis; the dotted arrows indicate the flow of moving liquids. Substantially all of the space enclosed within casing 20A and 20B is filled with two liquids of substantially different specific gravity. The relative amounts of light and heavy liquids used may be varied for different load conditions but substantial amounts of both liquids are required to make the mechanism operate at high efficiency. For this description it is assumed that the amount of heavy liquid used shall be sufficient to fill the auxiliary torus chamber 42. It is intended that this torque converter be operated with the axis approximately horizontal, although tilt of the axis such as may be encountered when climbing various types of inclines in a motor vehicle will not greatly affect its efficiency.

Power from an external source is applied to shaft 11 causing this shaft and the attached impeller unit to rotate. When the impeller unit is rotating at idling speed the heavy liquid is agitated sufficiently by impeller blades 13 and 19 to distribute it around the axis and to cause it to circulate slowly in torus chambers 41 and 42. As the impeller unit accelerates due to the increase in speed of the driving shaft 11, the force imparted to the heavy liquid by the accelerated movement of blades 19 in the auxiliary torus chamber 42 causes the heavy liquid to impinge on auxiliary turbine blades 24 with increasing force and speed and to be deflected inwardly into the main torus chamber 41 through passage 44 with lighter liquid replacing the heavy liquid in the outer torus chamber 42. This concentration of all the heavy liquid in the main torus chamber 41 imparts substantially greater starting and accelerating torque to the primary turbine blades 31 than the lighter liquid could exert alone. This concentration of force causes primary turbine rotor 30 to accelerate rapidly and as this rotor approaches the speed of the main impeller core 12, more force is exerted on the secondary turbine blades 22A and 22B causing casing 20A and 20B to accelerate with increasing speed, however the low gear ratio of the casing 20A and 20B to driven shaft 36 causes the acceleration of the casing to follow and be substantially slower than acceleration of the primary turbine rotor 30. As casing 20A and 20B gains speed, substantial centrifugal force is generated in the main torus chamber 41 causing the heavy liquid to move outwardly through opening 45 between the trailing edge of deflector band 16 and casing 20A and into auxiliary torus chamber 42. As the heavy liquid moves outwardly into said auxiliary chamber 42 it displaces the light liquid and exerts increasing torque on the auxiliary turbine blades 24 and casing 20A and 20B. At high operating speeds the heavy liquid is utilized in the auxiliary torus chamber 42 to exert maximum torque exclusively on the casing 20A and 20B. Due to the higher gear ratio connecting the primary turbine unit 30 to the driven shaft 36 and to the positioning of primary turbine blades 31 adjacent to the main impeller blades 13, the coupling between the main impeller unit and the primary turbine 30 is substantially more effective, and also more sensitive to changes in speed of the main impeller, than is the coupling between the auxiliary impeller and auxiliary impeller blades 19 and the auxiliary turbine 20A and 20B and auxiliary turbine blades 22B. By utilizing the heavy liquid entirely in the auxiliarly torus chamber 42 at normal speeds and loads, slippage between all sets of impeller and turbine blades is held to a low degree and efficiency is substantially higher than in converters utilizing one liquid only. The operation of this converter may be considered as shifting liquids with different specific gravities between sets of impeller and turbine blades to obtain an infinite number of gear ratios between a driving and driven shaft. Deflector band 16 is positioned in the opening between the two torus chambers 41 and 42 to guide the flow of the heavy liquid inwardly into the main torus chamber 41 and to retain it in that chamber when inwardly directed forces generated in the outer torus chamber 42 exceed the centrifugal force generated by the rotation of the casing. When the centrifugal force generated by the rotation of the casing 20A and 20B exceeds the inwardly directed forces generated in the auxiliary torus chamber 42, the heavy liquid moves outwardly and the deflector band 16 is effective in preventing turbulence and internal liquid friction between the liquids circulating in the two torus chambers 41 and 42. It will be noted that the deflector band 16 has a sharp leading edge extending outwardly into the auxiliary torus chamber 42 towards the trailing edge of auxiliary turbine blades 24. The positioning of this leading edge and the angle of the inward face of the deflector band 16 in relation to the axis of the converter is critical in determining the relative conditions under which the heavy liquid will move from one torus chamber to the other.

Stator cylinder 25 and stator blades 28 guide the fluid in the main torus chamber 41 to the leading edges of the main impeller blades 13. Although the stationary blades 28 stop the rotation of the liquids around the axis of the converter and cause the liquids to be delivered to the impeller blades 13 in a straight and constant direction, the hydraulic principles and utilization of forces embodied in this patent will operate without a stator unit, in which case the hydraulic mechanism may be considered a hydraulic coupling as distinguished in the art from a hydraulic torque converter. It is readily apparent that if stator cylinder 25 and parts attached thereto are eliminated and turbine rotor 12 and blades 13 are extended to occupy the space of stator 25 and blades 28, the operation of the fluid coupling resulting from this modification would be the same in principle as it is in the preferred embodiment of the invention shown herein. With such modification, the relationship of the two liquids and the two torus chambers, and the operation thereof, except for the guiding of the liquids to the main impeller by the stator unit, would be unchanged. The operation of this invention as a fluid coupling is within the scope of this invention and it is also intended that such application be within the scope of the appended claims.

What I claim is:
1. A fluid power transmission mechanism comprising a rotatable casing containing a working fluid consisting of a mixture of liquids of substantially different specific gravities, the ratio of liquids of different specific gravities in the working fluid being dependent upon the performance requirements expected of the mechanism, said casing having an internally positioned torus chamber and an interconnected externally positioned torus chamber circumferentially arranged about said internal torus chamber, a driving shaft, an impeller operably mounted on said driving shaft, said impeller having a plurality of main impeller blades attached thereto and positioned in the main torus chamber, a plurality of auxiliary impeller blades attached at the periphery of said impeller unit and located in the auxiliary torus chamber, and a fluid guiding mean attached to said impeller unit and positioned at the intersection of the torus chambers, a primary turbine having a plurality of blades attached thereto and located adjacent the main impeller, a secondary turbine having a plurality of blades attached thereto and located in the main torus chamber, an auxiliary turbine having a plurality of blades and located in the auxiliary torus chamber, said turbines coupled by the working fluid to the respective impeller means and driven by the impeller agitated working fluid, and a driven shaft operably connected to said turbines.

2. A fluid power transmission mechanism as described in claim 1 and further characterized by a vane ring attached to the impeller unit and located at the circumferential junction of the inner and outer torus chambers, said vane ring being substantially wedge shaped in section and being positioned to regulate and guide the flow of liquids between the two torus chambers.

3. A fluid power transmission mechanism as set forth in claim 1 comprising in addition thereto a stator means located between the casing and the impeller unit in the main torus chamber.

4. A fluid power transmission mechanism as set forth in claim 1 comprising a stator unit located between the casing and impeller unit, said stator unit being attached to a sleeve which extends around said driving shaft and axially through said casing, the exterior portion of said sleeve being rigidly attached to a fixed support to prevent rotation, said stator unit including a plurality of stationary blades which are located between the leading edges of the main impeller blades and the trailing edges of the secondary turbine blades with said stationary blades directing the fluid in a constant direction between said secondary turbine blades towards said main impeller blades.

5. A fluid power transmission mechanism comprising a rotatable casing containing a mixture of two fluids, one of a high and one of a low specific gravity, said casing having an internally positioned torus chamber and an interconnected externally positioned torus chamber circumferentially arranged about said internal torus chamber, a driving shaft, said driving shaft extending into the interior of said casing, an impeller operably mounted at the internal end of the driving shaft, said impeller having a plurality of main impeller blades attached thereto and located in the main torus chamber, a plurality of auxiliary impeller blades attached at the periphery of said impeller unit and located in the auxiliary torus chamber and a vane ring attached to the impeller unit and located at the circumferential junction of the inner and outer torus chambers, a primary turbine having a plurality of blades attached thereto and located adjacent the impeller, said turbine blades being positioned adjacent the trailing edges of the main impeller blades, a stator unit including a plurality of stator blades attached thereto and located adjacent the impeller unit, the trailing edges of said stator blades being positioned adjacent the leading edges of the impeller blades, a secondary turbine having a plurality of blades and located in the main torus chamber, said secondary turbine blades extending substantially from the trailing edges of the primary turbine blades to the leading edges of the stator blades, an auxiliary turbine having a plurality of blades and located in the auxiliary torus chamber, the leading edges of said auxiliary turbine blades being adjacent the trailing edges of said auxiliary impeller blades, said turbines driven by the impeller agitated fluid mixture, and a driven shaft operably connected to said turbines.

6. A fluid power transmission mechanism comprising a rotatable casing having a main torus chamber and an auxiliary torus chamber arranged circumferentially about said main chamber and interconnected therewith through an open space along the circumferential outer boundary of said main chamber and inner boundary of said auxiliary chamber, said chambers containing a constant volume of working fluid consisting of a mixture of two heterogeneous liquids of substantially different specific gravities, a driving member having primary impeller means positioned in said main torus chamber and auxiliary impeller means positioned in said auxiliary chamber, a driven member, a primary turbine member positioned in said main torus chamber and operably connected to said driven member, a secondary turbine member positioned in said main torus chamber and rigidly attached to said rotatable casing, auxiliary turbine blades positioned in said auxiliary torus chamber and rigidly attached to said rotatable housing whereby under conditions of high slip between said auxiliary impeller means and said auxiliary turbine means vortical flow is induced in the fluid in said auxiliary chamber, the trailing edge of said auxiliary turbine blades being positioned adjacent said opening whereby said vortical flow causes said fluids to be directed into said main torus chamber, the flow of said fluids between said chambers being dependent upon the resultant of the inward force created by said vortical flow and the outward centrifugal force created by the rotation of said casing acting upon the heavier of said fluids.

7. A fluid power transmission mechanism as set forth in claim 6 further comprising a vane ring positioned in said opening adjacent the trailing edges of said auxiliary turbine blades to direct the flow of said heavier fluid from said auxiliary chamber into said main chamber and to retain said heavier fluid in said main chamber during periods of high vortical flow of fluid in said main chamber.

References Cited in the file of this patent

UNITED STATES PATENTS

| | | |
|---|---|---|
| 838,765 | Bissell | Dec. 18, 1906 |
| 1,192,233 | Severy | July 25, 1916 |
| 2,480,933 | Jandasek | Sept. 6, 1949 |
| 2,602,295 | Anderson | July 8, 1952 |
| 2,616,261 | Huntington | Nov. 4, 1952 |
| 2,651,918 | Kelley et al. | Sept. 15, 1953 |
| 2,768,722 | Müller | Oct. 30, 1956 |

FOREIGN PATENTS

| | | |
|---|---|---|
| 594,804 | Great Britain | Nov. 19, 1947 |
| 692,286 | Great Britain | May 23, 1951 |